(12) United States Patent
Kalva et al.

(10) Patent No.: US 12,627,822 B2
(45) Date of Patent: May 12, 2026

(54) VIDEO AND FEATURE CODING FOR MULTI-TASK MACHINE LEARNING

(71) Applicant: OP Solutions LLC, Amherst, MA (US)

(72) Inventors: Hari Kalva, Boca Raton, FL (US);
Borivoje Furht, Boca Raton, FL (US);
Velibor Adzic, Canton, GA (US)

(73) Assignee: OP Solutions LLC, Amherst, MA (US)

( * ) Notice: Subject to any disclaimer, the term of this patent is extended or adjusted under 35 U.S.C. 154(b) by 0 days.

(21) Appl. No.: 18/745,467

(22) Filed: Jun. 17, 2024

(65) Prior Publication Data

US 2024/0357142 A1      Oct. 24, 2024

Related U.S. Application Data

(63) Continuation of application No. PCT/US2022/053579, filed on Dec. 21, 2022.

(60) Provisional application No. 63/293,217, filed on Dec. 23, 2021, provisional application No. 63/293,157, filed on Dec. 23, 2021.

(51) Int. Cl.
*H04N 19/42*          (2014.01)
*H04N 19/192*         (2014.01)
*H04N 19/70*          (2014.01)

(52) U.S. Cl.
CPC ........... *H04N 19/42* (2014.11); *H04N 19/192* (2014.11); *H04N 19/70* (2014.11)

(58) Field of Classification Search
None
See application file for complete search history.

(56) References Cited

U.S. PATENT DOCUMENTS

2021/0090217 A1 *   3/2021   Jiang ..................... G06T 3/4046
2022/0400270 A1 *   12/2022  Meardi ................. H04N 19/42

FOREIGN PATENT DOCUMENTS

WO          2023039627 A1      3/2023

OTHER PUBLICATIONS

Search Report in corresponding EP application 22912407.8 dated Nov. 24, 2025.
Lu Yu et al: "Potential Chances of Standarization on Video Coding for Machines (VCM)", 129. MPEG Meeting; Jan. 13, 2020-Jan. 17, 2020; Brussels; (Motion Picture Expert Group or ISO/IEC JTC1/SC29/WG11), No. m52123 Jan. 12, 2020 (Jan. 12, 2020), XP030224752.

(Continued)

*Primary Examiner* — Christopher Braniff
(74) *Attorney, Agent, or Firm* — OP Solutions IP Department; Paul Ackerman

(57) ABSTRACT

A system and method for video and feature coding of neural-network structures used for multi-task machine learning includes an encoder, decoder and a decoder-compliant bitstream. A task-specific video decoder includes a first decoder receiving a bitstream having at least one feature and a description of a neural network backbone used to generate the bitstream, and a task-specific neural network head. The neural network head recreates the neural network backbone from the description, receives a feature from the bitstream a generates a task-specific output.

24 Claims, 16 Drawing Sheets

(56)        References Cited

OTHER PUBLICATIONS

Mueller (Fraunhofer) K et al: "[NNR] Basic High-Level Syntax for Neural Network Compression (ISO/IEC 15938-17, i.e. MPEG-7 part 17)", 129. MPEG Meeting; Jan. 13, 2020-Jan. 17, 2020; Brussels; (Motion Picture Expert Group or ISO/IEC JTC1/SC29/WG11), No. m52352 Jan. 8, 2020 (Jan. 8, 2020), XP030224993.
Mueller (Fraunhofer) K et al: "[NNR] Additional HLS and decoding process specification for Neural Network Compression (ISO/IEC 15938-17)", 130. MPEG Meeting; Apr. 20, 2020-Apr. 24, 2020; Alpbach; (Motion Picture Expert Group or ISO/IEC JTC1/SC29/WG11), No. m53518 Apr. 15, 2020 (Apr. 15, 2020),XP030287099.

* cited by examiner

Multi learning

| Backbone t1 | Head 1 |
|:---:|:---:|
| Backbone t2 | Head 2 |
| ∘∘∘ | ∘∘∘ |
| Backbone tn | Head n |

| Final Backbone |
|:---:|

Transfer learning

1000

Bitstream stream-level header 1010

Feature Sub-bitstream

Feature stream header 1020 1015

1025 Feature stream payload

Video Sub-bitstream

1030

Video stream header 1035

Video stream payload 1040

NN description Substream 1045

NN description header 1050

NN description payload 1055

1400

VIDEO AND FEATURE CODING FOR MULTI-TASK MACHINE LEARNING

CROSS REFERENCE TO RELATED APPLICATIONS

This application is a continuation of international application serial number PCT/US22/53579 filed on Dec. 21, 2022, entitled VIDEO AND FEATURE CODING FOR MULTI-TASK MACHINE LEARNING, which claims the benefit of priority to U.S. Provisional Patent Application Ser. No. 63/293,157 filed on Dec. 23, 2021, and entitled VIDEO AND FEATURE CODING FOR MULTI-TASK MACHINE LEARNING and also claims the benefit of priority to U.S. Provisional Patent Application Ser. No. 63/293,217 filed on Dec. 23, 2021, and entitled SYSTEMS AND METHODS FOR ADAPTIVE NEURAL NETWORK OPTIMIZATION FOR MULTIPLE TASK FEATURE CODING, the disclosures of which are hereby incorporated by reference in their entireties.

FIELD OF THE INVENTION

The present invention generally relates to the field of video encoding and decoding. In particular, the present invention is directed to systems and methods for video and feature coding for multi-task machine learning.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, case of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

While video content is often considered for human consumption, there is a growing need for video in industrial settings and other settings in which the contend is evaluated by machines rather than humans.

Recent trends in robotics, surveillance, monitoring, Internet of Things, etc. introduced use cases in which significant portion of all the images and videos that are recorded in the field is consumed by machines only, without ever reaching human eyes. Those machines process images and videos with the goal of completing tasks such as object detection, object tracking, segmentation, event detection etc. Recognizing that this trend is prevalent and will only accelerate in the future, international standardization bodies established efforts to standardize image and video coding that is primarily optimized for machine consumption. For example, standards like JPEG AI and Video Coding for Machines are initiated in addition to already established standards such as Compact Descriptors for Visual Search, and Compact Descriptors for Video Analytics. Further improving encoding and decoding of video for consumption by machines and in hybrid systems in which video is consumed by both a human viewer and a machine is, therefore, of growing importance in the field.

In many applications, such as surveillance systems with multiple cameras, intelligent transportation, smart city applications, and/or intelligent industry applications, traditional video coding may require compression of large number of videos from cameras and transmission through a network for both machine consumption and for human consumption. Subsequently, at a machine site, algorithms for feature extraction may applied typically using convolutional neural networks or deep learning techniques including object detection, event action recognition, pose estimation and others.

SUMMARY OF THE DISCLOSURE

A task-specific decoder is provided that includes a first decoder receiving a bitstream, the bitstream having at least one feature and a description of a neural network backbone used by an encoder to generate the bitstream encoded therein. The task-specific decoder further includes a neural network head, the neural network head being trained for a specific task. The neural network head receiving the backbone description from the first decoder and recreating the neural network backbone. The neural network head further receiving the at least one feature and the output of the neural network backbone and generating a task-specific output.

In some embodiments, the first decoder includes a video decoder and a feature decoder. The task-specific decoder can further include a bitstream parser receiving the bitstream and providing a neural network description substream to the video decoder and a feature substream to the feature decoder.

In certain embodiments, the first decoder can include a neural network description decoder and a feature/video decoder. In this case, a bitstream parser can be provided which parses the received bitstream to provide a neural network description substream to the neural network description decoder and a feature substream to the feature/video decoder.

The task-specific decoder can include a plurality of neural network heads, with each neural network heads being trained for a specific task. Preferably, each neural network head receives the at least one feature and the output of the neural network backbone and generates a task-specific output.

A bitstream architecture is also provided. The bitstream includes a stream-level header, a feature sub-bitstream, a video sub-bitstream, and a neural network description sub-stream. The feature sub-bitstream preferably further comprises a feature stream header and a feature stream payload. The video sub-bitstream preferably includes a video stream header and a video stream payload. The neural network sub-bitstream preferably includes a neural network stream header and a neural network feature stream payload.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Figure 1:
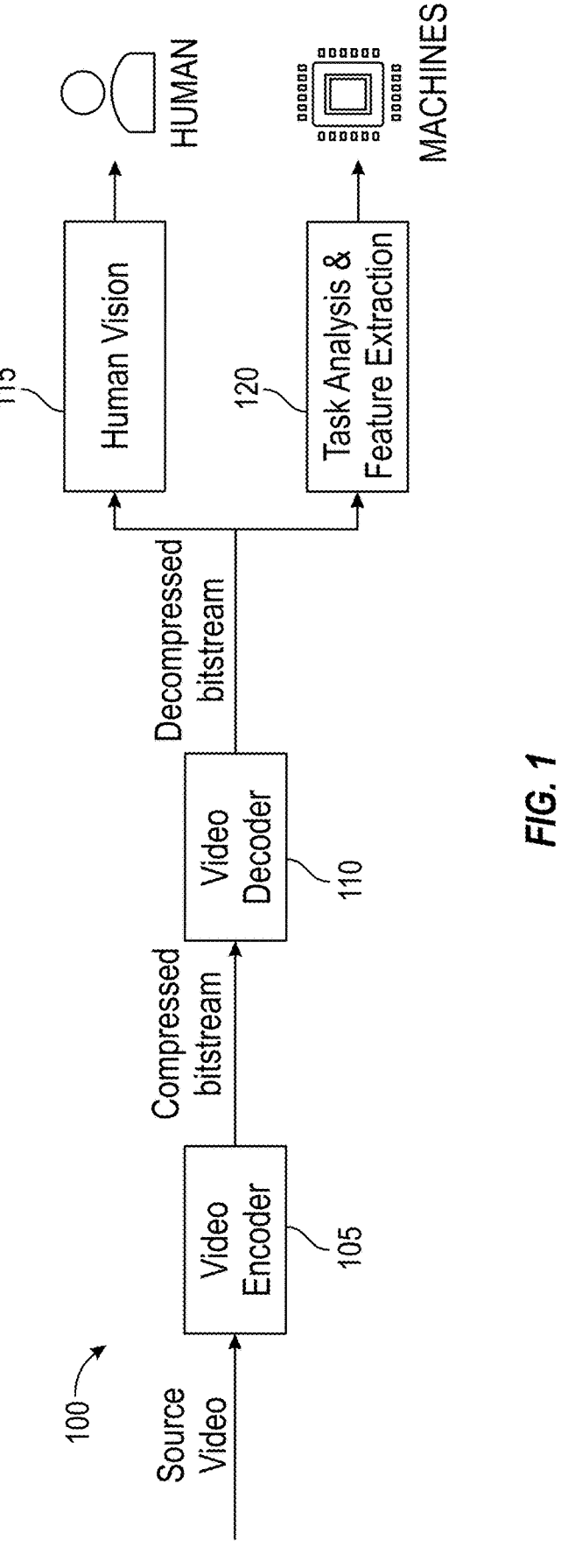
FIG. 1 is a simplified block diagram illustrating an exemplary embodiment of a video coding system.

FIG. 1 shows an exemplary embodiment of a VVC compliant coding/decoding system which includes a channel applied for machines. Conventional approaches unfortunately, may require a massive video transmission from multiple cameras, which may take significant time for efficient and fast real-time analysis and decision-making. In certain embodiments, a VCM approach may resolve this problem by both encoding video and extracting some features at a transmitter site and then transmitting a resultant encoded bit stream to a VCM decoder. At a decoder site, video may be decoded for human vision and features may be decoded for machines. As used herein, the term VCM refers broadly to video coding and decoding for machine consumption and is not limited to a specific proposed protocol.

A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

At a decoder site it will be appreciated that video may be decoded for human vision and features may be decoded for machines. Systems which provide video for both human vision and for machine consumption are sometimes referred to as hybrid systems. The systems and methods disclosed herein are intended to apply to machine-based systems as well as hybrid systems.

FIG. 1 is a high-level block diagram of a system for encoding and decoding video in a hybrid system which includes consumption of the video content by both human viewers and machine consumption. A source video is received by a video encoder 105 which provides a compressed bitstream for transmission over a channel to video decoder 110. The video encoder may encode the video for human consumption as well as encoding the video for machine consumption. The video decoder 110 provides complimentary processing on the compressed bitstream to extract the video for human vision 115 as well as task analysis and feature extraction 120 for machine consumption. Feature extraction can be classified as any computer vision task, such as edge detection, line detection, object detection, or more recent techniques such as convolutional neural networks where the output of the feature extraction can be spatially mapped back onto the pixel space of the input video. Video coding can include any standard video encoder and/or encoding techniques such as, for example, Advanced Video Codec (AVC), Versatile Video Coding (VVC), or High Efficiency Video Coding (HEVC).

Figure 2:
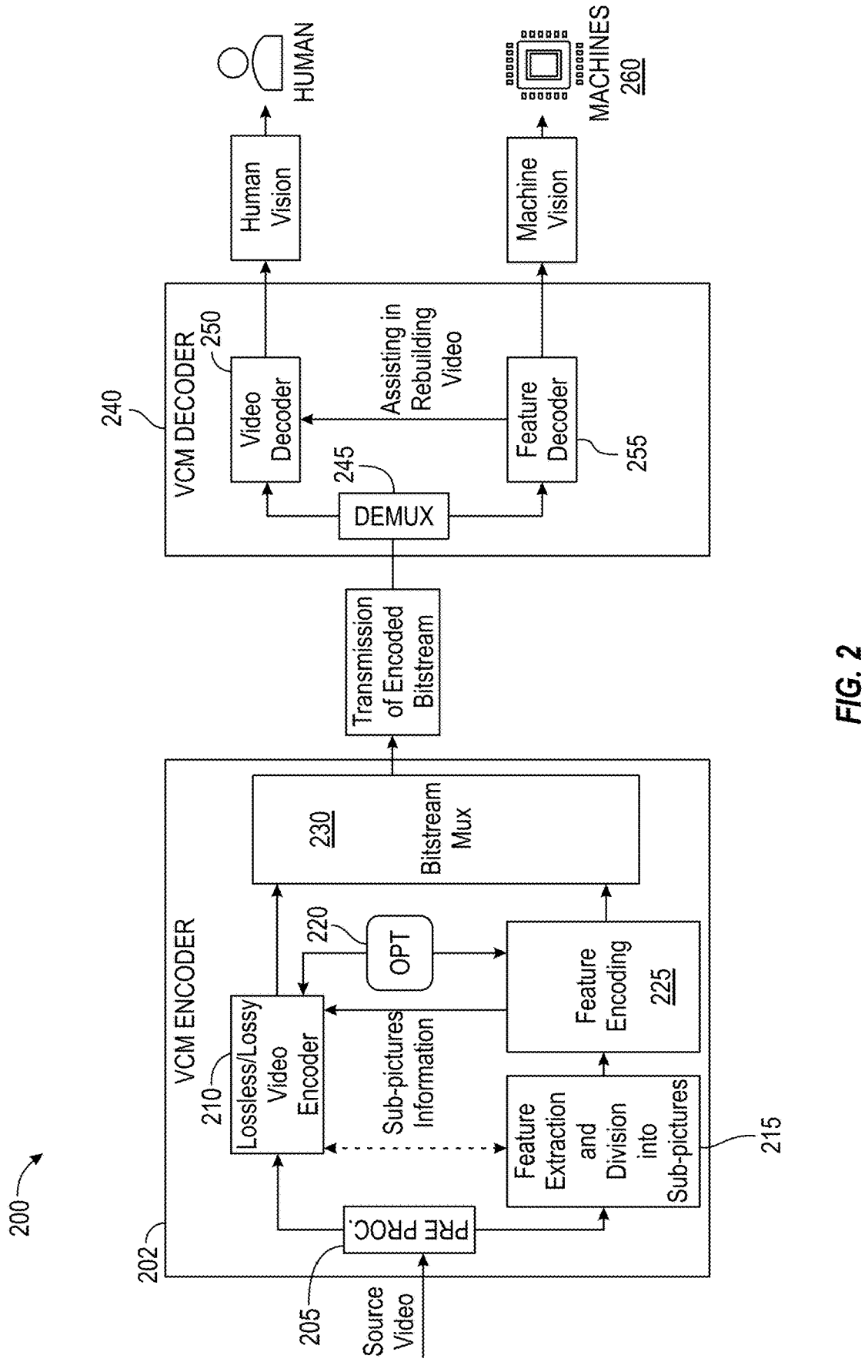
FIG. 2 is a simplified block diagram further illustrating an exemplary embodiment of a video coding for machines system.

Referring now to FIG. 2, an exemplary embodiment of encoder for video coding for machines (VCM) is illustrated. VCM encoder 202 may be implemented using any circuitry including without limitation digital and/or analog circuitry; VCM encoder 202 may be configured using hardware configuration, software configuration, firmware configuration, and/or any combination thereof. VCM encoder 202 may be implemented as a computing device and/or as a component of a computing device, which may include without limitation any computing device as described below. In an embodiment, VCM encoder 202 may be configured to receive an input video 204 and generate an output bitstream 208. Reception of an input video 204 may be accomplished in any manner described below. A bitstream may include, without limitation, any bitstream as described below.

VCM encoder 202 may include, without limitation, a pre-processor 206, a video encoder 210, a feature extractor 215, an optimizer 220, a feature encoder 225, and/or a multiplexor 230. Pre-processor 206 may receive input video 204 stream and parse out video, audio and metadata substreams of the stream. Pre-processor 206 may include and/or communicate with decoder as described in further detail below; in other words, Pre-processor 206 may have an ability to decode input streams. This may allow, in a non-limiting example, decoding of an input video 204, which may facilitate downstream pixel-domain analysis.

Further referring to FIG. 2, VCM encoder 202 may operate in a hybrid mode and/or in a video mode; when in the hybrid mode VCM encoder 200 may be configured to encode a visual signal that is intended for human consumers, to encode a feature signal that is intended for machine consumers; machine consumers may include, without limitation, any devices and/or components, including without limitation computing devices as described in further detail below. Input signal may be passed, for instance when in hybrid mode, through pre-processor 206.

Still referring to FIG. 2, video encoder 210 may include without limitation any video encoder 210 as described in further detail below. When VCM encoder 202 is in hybrid mode, VCM encoder 202 may send unmodified input video 204 to video encoder 210 and a copy of the same input video 204, and/or input video 204 that has been modified in some way, to feature extractor 215. Modifications to input video 204 may include any scaling, transforming, or other modification that may occur to persons skilled in the art upon reviewing the entirety of this disclosure. For instance, and without limitation, input video 204 may be resized to a smaller resolution, a certain number of pictures in a sequence of pictures in input video 204 may be discarded, reducing framerate of the input video 204, color information may be modified, for example and without limitation by converting an RGB video might be converted to a grayscale video, or the like.

Still referring to FIG. 2, video encoder 210 and feature extractor 215 are connected and might exchange useful information in both directions. For example, and without limitation, video encoder 210 may transfer motion estimation information to feature extractor 220, and vice-versa. Video encoder 210 may provide Quantization mapping and/or data descriptive thereof based on regions of interest (ROI), which video encoder 210 and/or feature extractor 215 may identify, to feature extractor 215, or vice-versa. Video encoder 210 may provide to feature extractor 215 data describing one or more partitioning decisions based on features present and/or identified in input video 204, input signal, and/or any frame and/or subframe thereof; feature extractor 218 may provide to video encoder 210 data describing one or more partitioning decisions based on features present and/or identified in input video 204, input signal, and/or any frame and/or subframe thereof. Video encoder 210 feature extractor 215 may share and/or transmit to one another temporal information for optimal group of pictures (GOP) decisions. Each of these techniques and/or processes may be performed, without limitation, as described in further detail below.

With continued reference to FIG. 2, feature extractor 220 may operate in an offline mode or in an online mode. Feature extractor 220 may identify and/or otherwise act on and/or manipulate features. A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

Still referring to FIG. 2, feature encoder 225 is configured for encoding a feature signal, for instance and without limitation as generated by feature extractor 220. In an embodiment, after extracting the features feature extractor 220 may pass extracted features to feature encoder 225. Feature encoder 225 may use entropy coding and/or similar techniques, for instance and without limitation as described below, to produce a feature stream, which may be passed to multiplexor 230. Video encoder 210 and/or feature encoder 225 may be connected via optimizer 220; optimizer 220 may exchange useful information between those video encoder 210 and feature encoder 225. For example, and without limitation, information related to codeword construction and/or length for entropy coding may be exchanged and reused, via optimizer 220, for optimal compression.

In an embodiment, and continuing to refer to FIG. 2, video encoder 210 may produce a video stream; video stream may be passed to multiplexor 230. Multiplexor 230 may multiplex video stream with a feature stream generated by feature encoder 225; alternatively or additionally, video and feature bitstreams may be transmitted over distinct channels, distinct networks, to distinct devices, and/or at distinct times or time intervals (time multiplexing). Each of video stream and feature stream may be implemented in any manner suitable for implementation of any bitstream as described in this disclosure. In an embodiment, multiplexed video stream and feature stream may produce a hybrid bitstream, which may be is transmitted as described in further detail below.

Still referring to FIG. 2, where VCM encoder 200 is in video mode, VCM encoder 200 may use video encoder 210 for both video and feature encoding. Feature extractor 220 may transmit features to video encoder 210; the video encoder 210 may encode features into a video stream that may be decoded by a corresponding video decoder 250. It should be noted that VCM encoder 200 may use a single video encoder 210 for both video encoding and feature encoding, in which case it may use different set of parameters for video and features; alternatively, VCM encoder 200 may two separate video encoder 210s, which may operate in parallel.

Still referring to FIG. 2, system 200 may include and/or communicate with, a VCM decoder 240. VCM decoder 240 and/or elements thereof may be implemented using any circuitry and/or type of configuration suitable for configuration of VCM encoder 200 as described above. VCM decoder 240 may include, without limitation, a demultiplexor 245. Demultiplexor 245 may operate to demultiplex bitstreams if multiplexed as described above. For instance and without limitation, demultiplexor 245 may separate a multiplexed bitstream containing one or more video bitstreams and one or more feature bitstreams into separate video and feature bitstreams.

Continuing to refer to FIG. 2, VCM decoder 240 may include a video decoder 250. Video decoder 250 may be implemented, without limitation in any manner suitable for a decoder as described in further detail below. In an embodiment, and without limitation, video decoder 250 may generate an output video, which may be viewed by a human or other creature and/or device having visual sensory abilities.

Still referring to FIG. 2, VCM decoder 240 may include a feature decoder 255. In an embodiment, and without limitation, feature decoder 255 may be configured to provide one or more decoded data to a machine. Machine may include, without limitation, any computing device as described below, including without limitation any microcontroller, processor, embedded system, system on a chip, network node, or the like. Machine may operate, store, train, receive input from, produce output for, and/or otherwise interact with a machine model as described in further detail below. Machine may be included in an Internet of Things (IOT), defined as a network of objects having processing and communication components, some of which may not be conventional computing devices such as desktop computers, laptop computers, and/or mobile devices. Objects in IoT may include, without limitation, any devices with an embedded microprocessor and/or microcontroller and one or more components for interfacing with a local area network (LAN) and/or wide-area network (WAN); one or more components may include, without limitation, a wireless transceiver, for instance communicating in the 2.4-2.485 GHz range, like BLUETOOTH transceivers following protocols as promulgated by Bluetooth SIG, Inc. of Kirkland, Wash, and/or network communication components operating according to the MODBUS protocol promulgated by Schneider Electric SE of Rueil-Malmaison, France and/or the ZIGBEE specification of the IEEE 802.15.4 standard promulgated by the Institute of Electronic and Electrical Engineers (IEEE). Persons skilled in the art, upon reviewing the entirety of this disclosure, will be aware of various alternative or additional communication protocols and devices supporting such protocols that may be employed consistently with this disclosure, each of which is contemplated as within the scope of this disclosure.

With continued reference to FIG. 2, each of VCM encoder 202 and/or VCM decoder 240 may be designed and/or configured to perform any method, method step, or sequence of method steps in any embodiment described in this disclosure, in any order and with any degree of repetition. For instance, each of VCM encoder 202 and/or VCM decoder 240 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Each of VCM encoder 202 and/or VCM decoder 240 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

The present systems and methods are based on a machine learning architecture that supports multiple tasks for the end users. Most common machine learning architectures used today are neural networks. One of the shortcomings of simple, single-task neural networks is time complexity and computational cost of training. To achieve high performance, neural networks typically must be trained using very large datasets with hundreds of thousands and sometimes millions of samples such as images and videos. Training a separate network each time a new use case arises can be highly redundant and resource wasteful. Therefore, methods have been developed to reuse already trained portions of neural networks for multiple tasks. By training one part of the network to support multiple tasks, users can save storage space, computational power, and reduce energy consumption.

Figure 3:
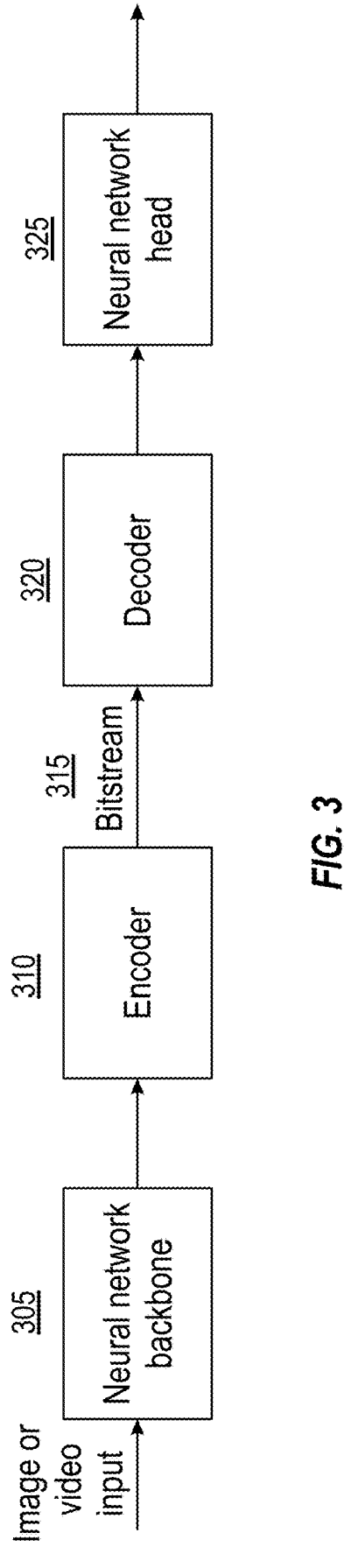
FIG. 3 is a simplified block diagram illustrating an exemplary embodiment of a system for encoding and decoding video for machine consumption as described in this disclosure.

Referring now to FIG. 3, components of a system and method for video and feature coding of neural-network structures used for multi-task machine learning is disclosed. System includes a neural network backbone 305, an encoder 310, a bitstream 315 being sent over a channel, a bitstream compliant decoder 320 and a neural network head 325. The system can be utilized for machine learning tasks such as object detection, event detection, tracking, segmentation, etc. Its intended end-user is either human or machine.

System and method can be used in the ongoing standardizations such as Video Coding for Machines, and utilized in the use cases such as Internet of Things, etc.

In the context of a neural network, the backbone is the part of the network that comprises the majority of the layers and nodes and is largely responsible for the bulk of the computation. The head, on the other hand, is the part of the network that is responsible for making the final predictions or decisions based on the output of the backbone. As used herein, those parts of the neural networks that can be reused and don't change substantially for different tasks are called "neural network backbone" (backbone). The rest of the neural network(s) that is modified based on the target task is called "neural network head" (head).

Figure 4:
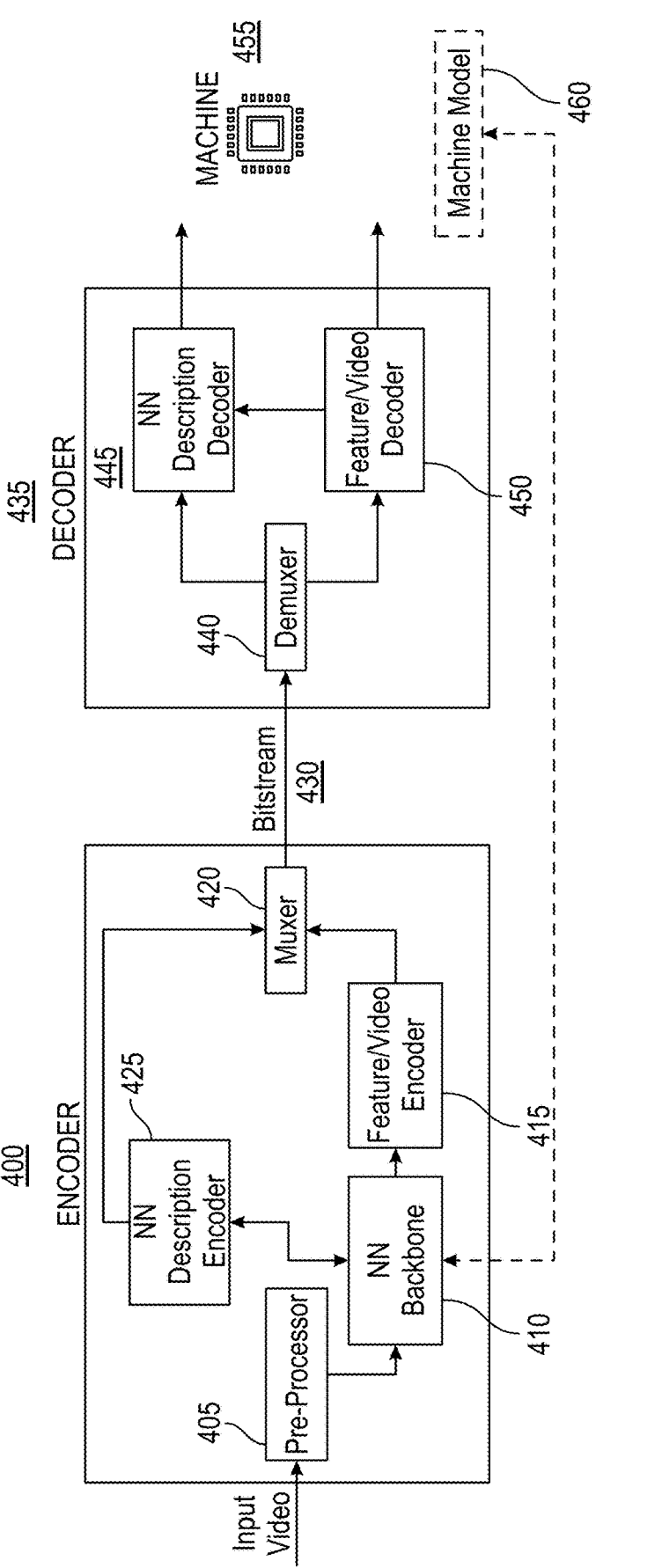
FIG. 4 is a block diagram further illustrating an exemplary embodiment of a system for adaptive neural network optimization for multiple task feature coding.

FIG. 4 is a block diagram illustrating an exemplary embodiment of a system for adaptive neural network optimization for multiple task feature coding; system may be used in a method for adaptive neural network optimization that can be used for multiple task feature coding in systems that implement standards such as Video Coding for Machines (VCM), or any other system that is implementing neural networks for image and video processing by machines, such as Internet of Things (IoT).

Typically, an input image or video is passed through the encoder 400 that extracts the relevant features. The encoder 400 includes a preprocessor 405 that is coupled to a neural network backbone (NNB) 410, the output of which is a set of features that can be further compressed using feature or video encoder 415. The NNB 410 may also receive input and/or training data from a machine model 460. The output of video encoder 415 is a feature substream. In addition to the features, the description of the NNB 410 can be compressed and a description substream may be combined in multiplexor 420 with the feature substream from a neural network description encoder 425 to form the bitstream 430.

Bitstream 430 is sent over a channel to a decoder 435 which decodes/decompresses the two substreams and produces the NNB description as well as a feature set. The bitstream 430 is received by a demuxer 440 which parses the bitstream into an NNB description substream applied to neural network description decoder 445 and a feature set substream which is applied to a feature/video decoder 450. End user (machine) 455 receives the feature set and passes it as an input to the neural network head (e.g., FIG. 3, 325) (NNH), which at the output produces decisions related to the task or tasks that are conducted by the machine. This is possible in cases, for example, where the complete neural network (NN) is pre-trained and the parameters of the NNB are known and not changed.

Figure 5:
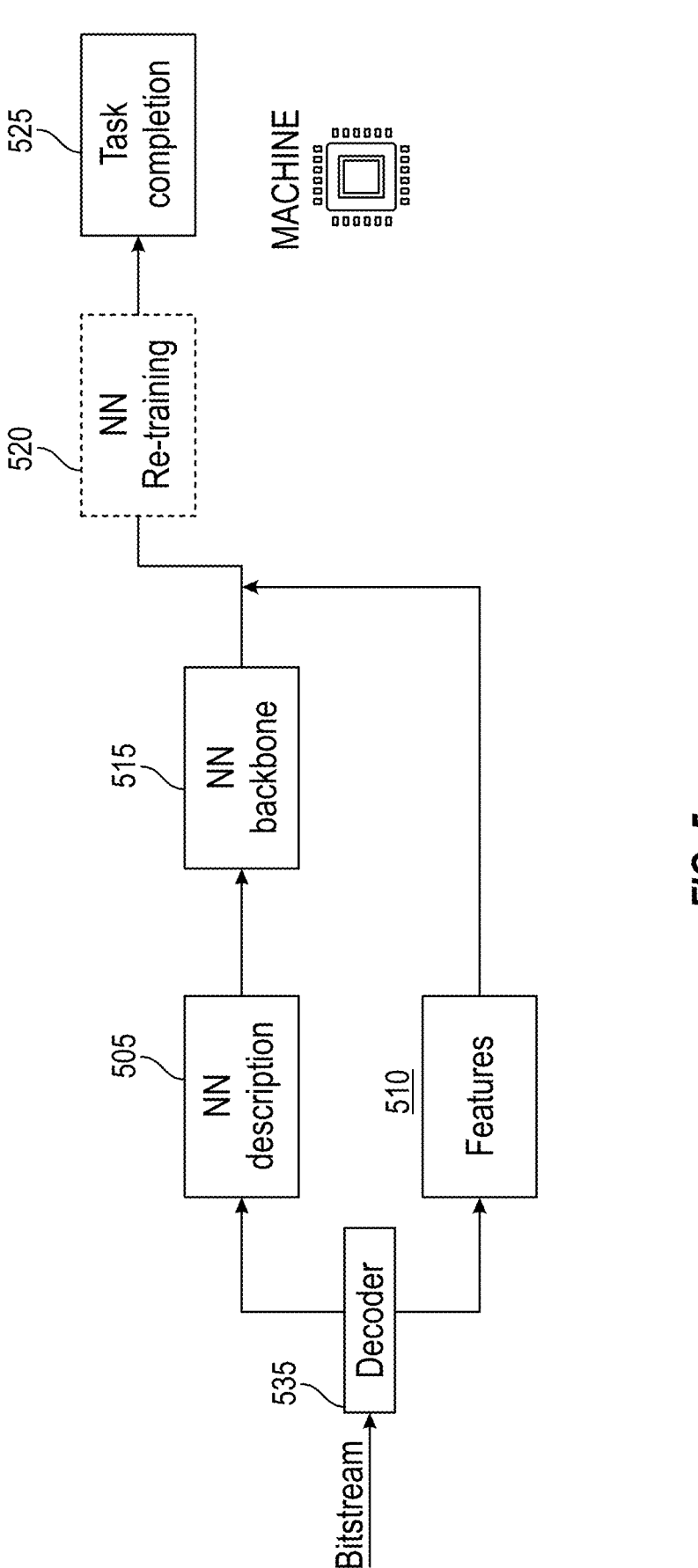
FIG. 5 is a block diagram further illustrating an exemplary embodiment of a machine process with decoder outputs as inputs for the task completion.

FIG. 5 is a block diagram illustrating an exemplary embodiment of a machine process with the outputs of decoder 435 serving as inputs for the task completion 525. In cases where the NNB 410 is not trained by the machine and the parameters of NNB 410 are not known, the machine receives the NNB description from the decoder 435 and reconstructs the complete NN backbone 515, and optionally conducts fine tuning of the NNH, either to align with the NNB, or to support additional tasks that were not included in the original NNB training. Here, NN re-training (NNH fine tuning) is an optional step 520.

If machine 455 knows the complete NN, such as by knowing all NNB parameters, the NNB description does not need to be transmitted to the decoder. In this case the bitstream may only contain the feature substream 510.

To facilitate flexibility on the encoder side, in cases when the tasks need to be changed, or the parameters of the current task need to be changed, the machine can send the NNB description to the encoder side which aligns with the pertinent machine model. This is depicted in FIG. 1.

Together with the NNB description, decoder sends a time interval for which the given NNB description is valid. After expiration of the time interval the NNB description reverts to the previous one or the default one.

On the encoder side, the feature/video encoder can be implemented using the existing video and feature standards such as Versatile Video Coding (VVC), High Efficiency Video Coding (HEVC), AOMedia Video 1 (AV1), Compact Descriptors for Video Analysis (CDVA), or similar.

The NN description encoder can be implemented using simple techniques such as Variable Length Coding (VLC), or the more advanced standards such as Neural Network Compression and Representation (NNR), or similar.

Figures 6, 6A, 6B:
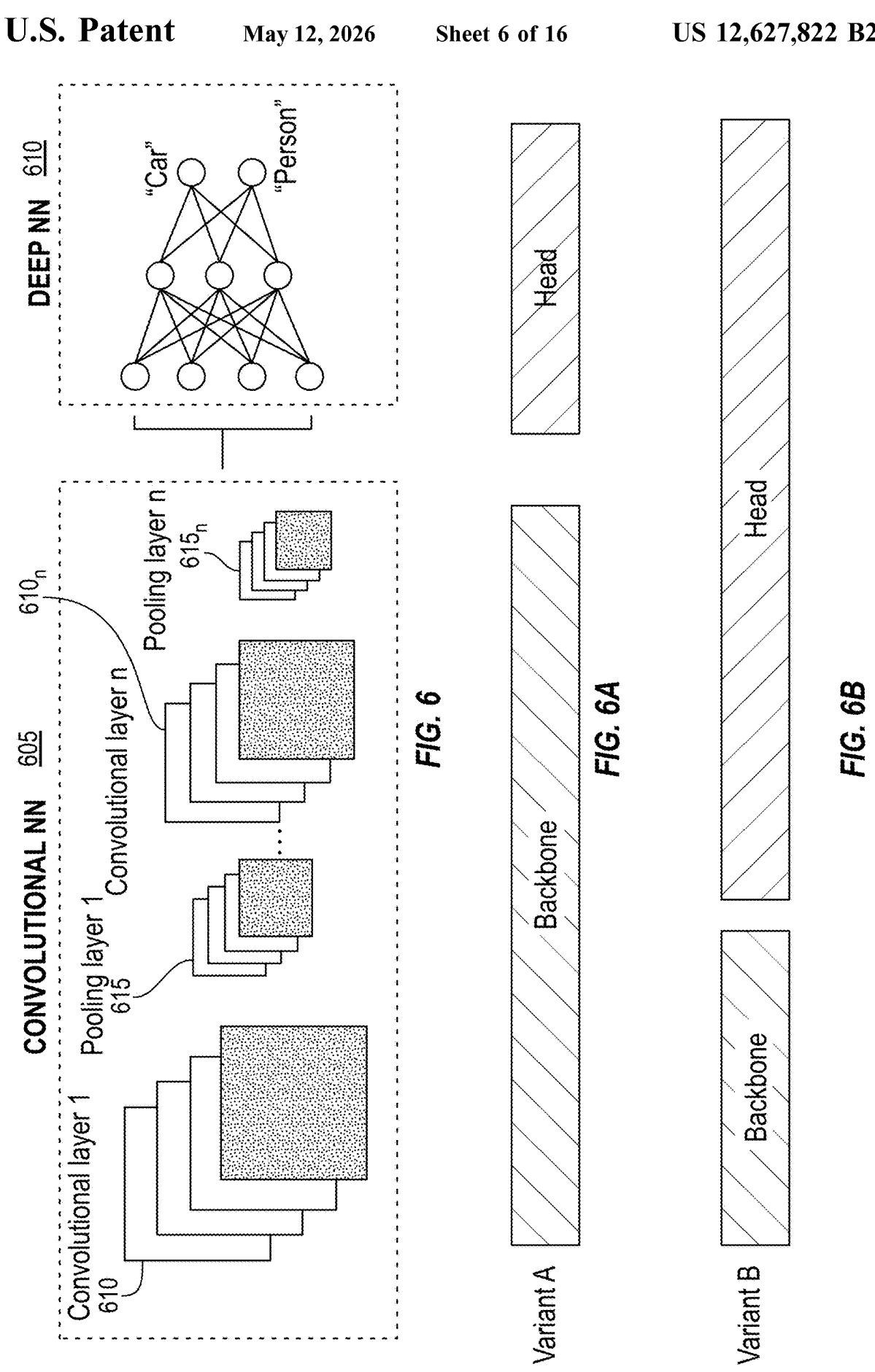
FIG. 6 is a schematic diagram illustrating an exemplary embodiment of a neural network as described in this disclosure.
FIG. 6A is a schematic diagram illustrating a first variant of neural network backbone-head separation as described in this disclosure.
FIG. 6B is a schematic diagram illustrating a second variant of neural network backbone-head separation as described in this disclosure.

FIG. 6 is a schematic diagram illustrating an exemplary embodiment of a neural network as described in this disclosure, illustrating a combined convolutional neural network-deep neural network (CNN-DNN) architecture for machine learning for images and video data. Input image or video is passed through the convolutional neural network (CNN) 605 which uses series of processing steps comprising convolution layers 610 and pooling layers 615. Each layer in the network uses filters to process the input and outputs so-called feature maps, which are two-dimensional images containing certain level of details pertinent to the overall task. CNNs can have anywhere from two or three to tens of such layers. Lower layers filter small details of the input image such as edges and lines. As we progress through the higher layers of the CNN, the outputs more closely represent the features of interest of the task. For example, the highest layers in the CNN for face detection will produce feature maps that contain features such as eye contours, nose contours, etc. Output of the highest layer is "flattened" and passed through the deep neural network (DNN) 610, which outputs the probability that image contains certain object, with or without the location details.

Besides object detection tasks, same architecture with minor modifications can be used for object tracking, segmentation, event detection, and other tasks. As we have seen, the more generic features are represented at the lower layers of the CNN 605. Those features are shared between different objects, and sometimes even between different tasks. This fact is used in the design of the multi-task architectures. Parts of the neural networks that can be reused and don't change for different tasks are called "neural network backbone" (backbone). The rest of the neural network(s) that is modified based on the target task is called "neural network head" (head).

Referring to FIGS. 6A and 6B, two exemplary variants of a backbone-head separation of the multi-task architecture are shown. A process of training may be universal for all backbone-head architectures and variants—e.g., the backbone is trained only once and all the parameters (such as connection weights and activation function thresholds) are not typically changed. Using this backbone, the head is added to it, such as by connecting the last layer of the backbone to the first layer of the head. Then the whole network is put through training such that backbone parameters are kept constant and only the parameters of the head are changed until the satisfactory performance is achieved on the training and/or validation datasets.

In FIG. 6A (variant A) the entire CNN 605 is designated as a backbone, while the DNN 610 is designated as a head. This means that CNN 605 may be trained only once while the DNN 610 can be trained multiple times, each time for a separate task, or alternatively several DNNs 610 can be trained, each one for a separate task. This variant is most suitable for tasks that span different modalities—such as object detection and event detection. For example, the backbone can be trained to detect people, while a first head can be trained to identify persons and a second head trained to detect gatherings of certain number of people, respectively.

In FIG. 6B, the variant B, only first part of the CNN 605, e.g., the first convolution layer 610 and first pooling layer 615 is designated as a backbone, while the rest of the CNN 605 together with the DNN 610 is designated as a head. Although FIG. 6B illustrates an example where only the first layer is included in the backbone, the number of lower layers of the CNN 505 that may be included in the backbone can vary and be specified beforehand or decided upon during the training process. In general, all the lower layers that represent features which are most generic relative to the tasks are included in the backbone. This variant in FIG. 6B is most suitable for more generic task support. The backbone can be reused in the tasks for different object detection. For example, the backbone that detects contours and edges for both people and animals can be used to facilitate detection and tracking tasks of moving living objects.

The presented variants A and B are selected only for illustrative purposes since the cut-off point for the backbone-head separation can be implemented at any layer of the CNN or DNN. In one extreme case, depicted in FIG. 6B, the backbone contains only the first layer of the CNN. This implementation greatly reduces the computational load of the edge device, and offloads most of the computation to the central server. It will also, in most of the cases, produce larger bitstream. On the other extreme, the head can contain only the last layer of the DNN, and in this case almost the entire computation is conducted at the edge device.

To determine the correct cut-off point, system architect needs to decide which tradeoffs are appropriate for a given use case. Tradeoffs to consider are power consumption, computational constraints, bitstream bandwidth, etc. The decisions greatly depend on the type of devices that take up the role of the encoder, the decoder, and on the available communication channel.

Figures 7A, 7B:
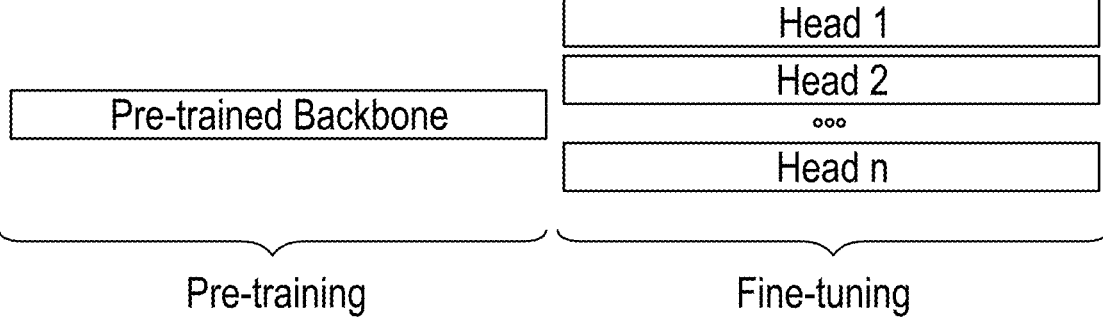
FIG. 7A is a schematic diagram illustrating an exemplary embodiment of multi-task learning employing multi-learning as described in this disclosure.
FIG. 7B is a schematic diagram illustrating an exemplary embodiment of multi-task learning employing transfer learning as described in this disclosure.

FIG. 7 is a schematic diagram illustrating an exemplary embodiment of multi-task learning as described in this disclosure; two types of multi-task learning are disclosed in FIGS. 7A and 7B, respectively. Referring to FIG. 7A, the first type is multi-learning. In multi-learning, the backbone together with heads is trained for each task. Learning epochs 1 to n are performed for tasks 1 to n. In each epoch, the backbone is combined with the head and the whole network is trained, updating the parameters of both the backbone and the head. After each epoch, the backbone parameters change. After n epochs, the backbone contains final values of the parameters that remain constant. This final backbone is then used for all the n tasks without the need for additional updates. This type may be preferable if the dataset for training is small, and/or if there is a balance in the amount of data available for each task.

The second type, illustrated in FIG. 7B, is transfer learning. In transfer learning, the backbone is trained only once, using a pre-training process or processes. Afterwards, for each task from 1 to n, the head 1 to n is added to the pre-trained backbone, and the training is done only on the parameters of the head, in a process called fine-tuning. This type of learning may be preferable when the training dataset is large, and/or there is disbalance in the amount of data available for each task.

Transfer learning is more widely used in practice, and generally allows greater flexibility in utilizing the present system. Nevertheless, both types of learning can produce a backbone that is suitable for use in the present system. Going back to the simplified block diagram in FIG. 3, on the encoder side, as an input we have the neural network backbone 305, while the output of the decoder is passed to the neural network head(s) 325.

Embodiments of some exemplary systems assume availability of pre-trained backbone at the encoder site. The process of backbone training can take any suitable form known in the art. Training can be done offline or online, at the encoder site or at some other location, etc. If the training is performed away from the encoder, all the pertinent parameters or parameter updates need to be transmitted to the encoder before encoding commences. Training can be done at the encoder site, with or without utilizing the joint training with the encoder. Joint training with an encoder may be performed as described in PCT application PCT/US22/40722 filed on Aug. 18, 2022, and entitled "SYSTEMS AND METHODS FOR JOINT OPTIMIZATION TRAINING," the entirety of which is incorporated herein by reference. Training complexity and resource considerations such as storage availability and energy consumption may constitute main factors in deciding on the online/offline learning tradeoff and the location of the learning.

Figures 8, 9:
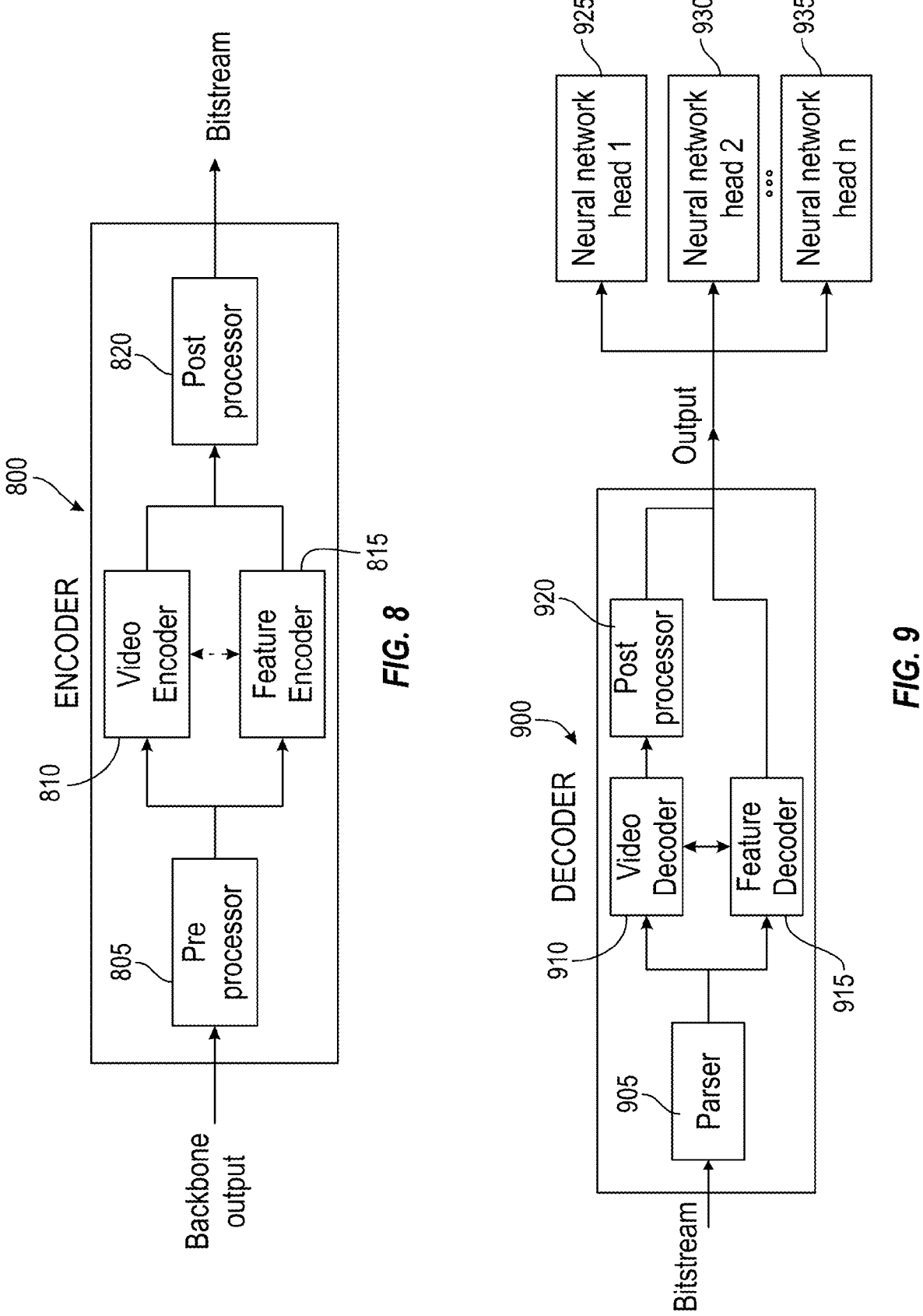
FIG. 8 is a block diagram illustrating an exemplary embodiment of an encoder as described in this disclosure.
FIG. 9 is a block diagram illustrating an exemplary embodiment of a decoder as described in this disclosure.

FIG. 8 is a block diagram further illustrating an exemplary embodiment of an encoder 800 as described in this disclosure. As illustrated in FIG. 3, the input to the encoder 300, 800 may be the output of the backbone network 305. Referring back to FIG. 8, this output is passed through the pre-processor 805. Pre-processor 805 takes the backbone output that is most commonly in the form of the feature maps and recombines them into format suitable for video encoding and feature encoding. One example of suitable recombining is arranging consecutive feature maps into single frame as consecutive regions of the frame. Details of feature maps recombining may be as disclosed in PCT application PCT/US22/32048, filed on Jun. 3, 2022, and entitled "VIDEO CODING FOR MACHINES (VCM) ENCODER," the entirety of which is incorporated herein by reference. For the feature encoder in many cases there may be no need for pre-processing.

The encoder 800 may include, but does not necessarily need to contain both, a video encoder 810 and a feature encoder 815. The encoder 800 can operate in three modes. A first mode is joint encoding mode: in this mode both video encoder 810 and feature encoder 815 are present. Feature encoder 815 is compressing the description of the neural network backbone as well as all the parameters of the backbone. This can be done using statistical coding such as variable length coding (VLC), or arithmetic coding, or context-adaptive binary arithmetic coding, or any other similar type of coding. Output of the feature encoder 815 is a feature bitstream that can be used by the decoder to identify the proper backbone and populate required parameters if needed. Video encoder 810 is compressing the recombined feature maps, using the traditional block-based frequency transform, motion compensated encoding. Video encoder 810 can employ standard encoders such as Versatile Video Coding (VVC), High Efficiency Video Coding (HEVC), Advanced Video Coding (AVC), AOMedia Video 1 (AV1), or similar.

Input to the encoder 800 is preferably standard-compliant because of the pre-processing that ensures proper format. The output of the video encoder is a video bitstream that can be used by a video decoder to output the feature maps with the arbitrary level of degradation (which was introduced by the video encoder). For each frame, besides standard parameters, the header contains information on feature map locations and sequence, so that the feature maps can be extracted from the decoded frames in proper order. Feature encoder 815 and video encoder 810 can communicate in real time while encoding, in order to optimize the compression of both the video and feature streams by removing statistical redundancies. Details of Feature Encoder communication with the Video Encoder are described in PCT application PCT/US22/47829 filed on Oct. 26, 2022 and entitled "SYSTEMS AND METHODS FOR OBJECT AND EVENT DETECTION AND FEATURE-BASED RATE-DISTORTION OPTIMIZATION FOR VIDEO CODING," the entirety of which is incorporated herein by reference, and in PCT application PCT/US22/48376 filed on Oct. 31, 2022, and entitled "SYSTEMS AND METHODS FOR MOTION INFORMATION TRANSFER FROM VISUAL TO FEATURE DOMAIN AND FEATURE-BASED DECODER-SIDE MOTION VECTOR REFINEMENT CONTROL," the entirety of which is incorporated herein by reference. Post-processor may combine the two sub-bitstreams into single bitstream with the stream-level header that contains appropriate parameters.

A second mode in which encoder 800 may operate is video encoding only mode: in this mode the feature maps are encoded as in the previous mode using video encoder 810, while the description of the neural network backbone as well as all the parameters of the backbone are passed to the video encoder 810 as header parameters. For example, using the Supplemental enhancement information (SEI). The parameters may be implicitly encoded using the video encoder's 810 entropy coding (same as all the other header and supplemental information).

A third mode in which encoder 800 may operate is feature encoding only mode: in this mode the feature encoder 815 is compressing the description of the neural network backbone as well as all the parameters of the backbone, as well as the features (such as feature maps). To compress features, the techniques are used such as VLC, Huffman coding, Compact Descriptors for Video Analysis (CDVA), or similar.

FIG. 9 is a block diagram illustrating an exemplary embodiment of a decoder 900, further detailing decoder 320 introduced in FIG. 3. Decoder 900 receives the bitstream, which is passed to a parser 905 which parses the stream-level header to extract video and feature sub-bitstreams. In the cases where video encoder only mode is used, the bitstream may be passed directly to the video decoder 910 without parsing. In the cases where feature encoder only mode is used, the bitstream may be passed directly to the feature decoder 915 without parsing.

Feature bitstream is passed to the feature decoder 915 which reconstructs feature stream using the inverse process of the feature encoder. The extracted feature stream is passed to the output. The video stream is passed to the video decoder 910. Video decoder reconstructs the original image/video using the standard video decoding process. Decoded frames are passed to the post-processor 920 which reconstructs original feature maps in the proper order and converts the image format to the original one, if applicable. A stream of reconstructed original feature maps is passed to the output.

Output of the decoder 900 is passed to the end user, which can be human or the machine. Combining the information from the feature stream and the video stream, end user can apply the reconstructed backbone network to the appropriate task. The system may further include one or more task-specific neural network heads 925, 930, 935. End user obtains the full backbone network description and feature maps, which are sufficient to complete the task by using appropriate head network 925, 930, 935.

Use Case Example

An edge device with limited computational capabilities and/or energy constraint can be preloaded with the backbone network. The device uses a camera to record the video. Video is passed through the backbone network and encoded by the proposed encoder. An encoded bitstream is then passed to the central station that decodes the bitstream and can provide the decoded information into multiple task head networks. In this way a central station can detect movement, detect persons, and detect events of interest-all from the single bitstream. The bulk of the overall process (backbone pre-training, and multiple task head fine tuning) is offloaded to the central station which has appropriate resources. The Backbone can be re-trained from time to time at the central station and sent back to the edge device for update.

Figure 10:
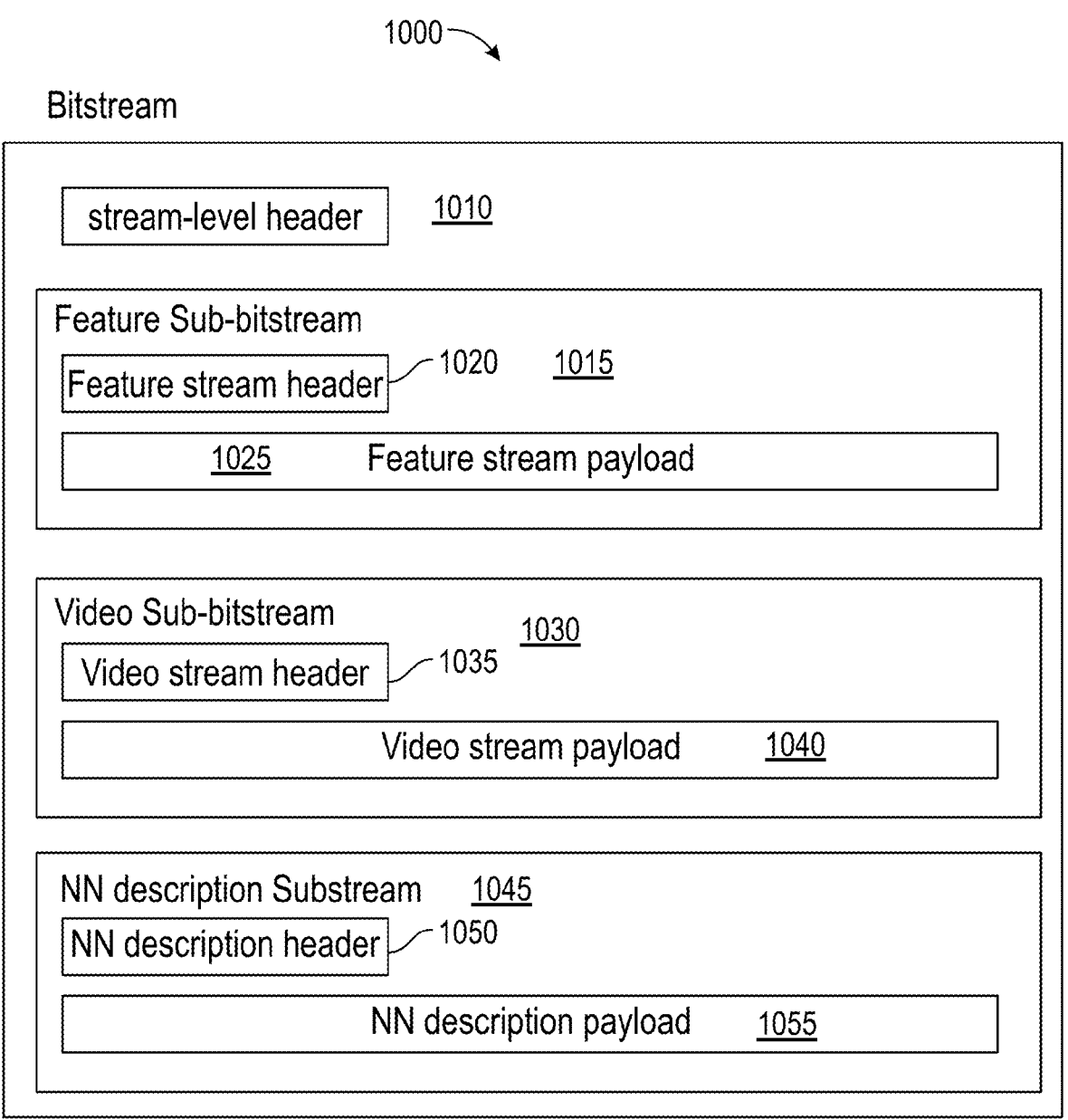
FIG. 10 is a block diagram illustrating an exemplary embodiment of a bitstream as described in this disclosure.

FIG. 10 is a block diagram illustrating an exemplary embodiment of a bitstream 1000 as described in this disclosure. The structure of the proposed bitstream is following: (i) Bitstream-level header 1010: contains high level syntax describing the presence of the sub-bitstreams and containing parameters of such sub-bitstreams, such as length, duration, format, etc. This information is used by the parser 905 in the decoder 900 to extract sub-bitstreams; (ii) Feature sub-bitstream 1015: contains feature stream header 1020 which describes the feature stream payload 1025 in terms of length, format, and other pertinent parameters. Feature stream header 1020 is used by the feature decoder 915 to extract and decode the feature stream payload; (iii) Video sub-bitstream 1030: contains video stream header 1035 that describes the video stream payload 1040 in terms of length, duration, resolution, frame rate, and other pertinent parameters. Video stream header is used by the video decoder to properly extract and decode the video stream payload; (iv) NN description substream 1045: contains NN description header 1050 and NN description payload 1055.

In the case where a standard video encoder is used, the video sub-bitstream 1030 contains all the elements of the encoded video bitstream, such as Sequence parameter set (SPS), Picture parameter set (PPS), Picture header (PH), Slice header (SH). Headers are either modified to contain additional information on the feature map size and positioning, or alternatively this information is added using the Supplemental enhancement information (SEI). In the case of using only SEI for signaling the pertinent information, the video sub-bitstream is completely standard-compliant with the existing standard decoder.

Alternatively or additionally, the bitstream 1000 can include a neural network (NN) description substream 1045 which may contain the NN description header 1050 which contains parameters such as describing the length, format, and type of the NN description, and a NN description payload 1055. Alternatively, instead of the complete description of all NN parameters, the encoder can signal the index of the used NN in the look-up table or a list that is predetermined and agreed upon. This list can be maintained by a central registration authority which updates it and signals the updates to the end users. NN description header is used by the feature decoder 915 to extract and decode the NN description payload.

Depending on the level of abstraction and cross-task generalization, the splitting point between the NNH and NNB can be adaptively selected. Also, when NN is trained for multiple tasks and use cases, parts of it can be mostly or fully related to concrete tasks, while other parts might be mostly or fully redundant for a concrete task. In the following paragraphs, two techniques for adaptive optimization: vertical optimization (task-specific ablation) and horizontal optimization (computational offloading) are presented.

Figure 11:
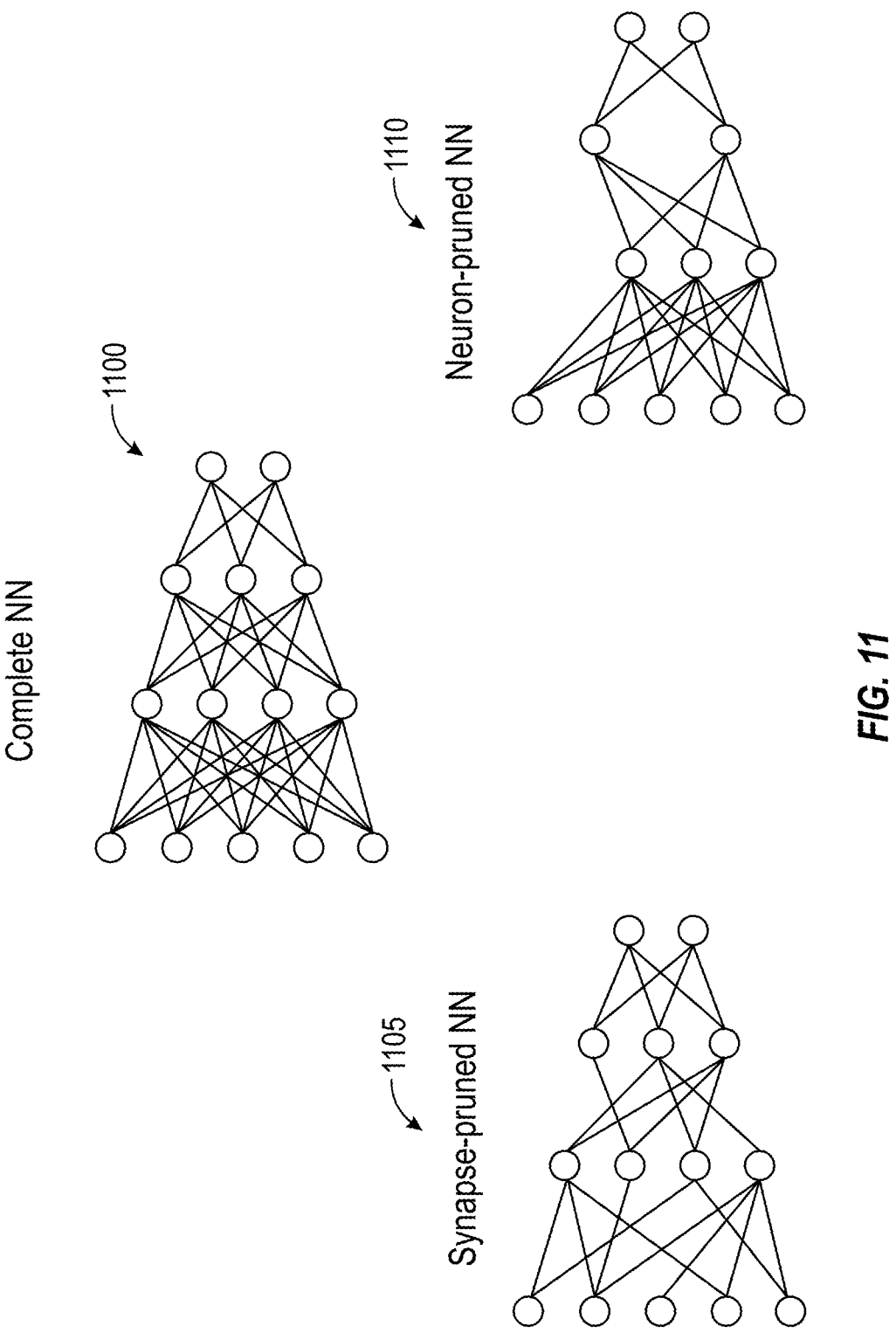
FIG. 11 is a schematic diagram illustrating exemplary embodiments of pruned neural networks.

FIG. 11 is a schematic diagram illustrating exemplary embodiments of pruned neural networks; such embodiments may implement vertical optimization and/or task-specific ablation The technique of ablation or pruning has been well established in the machine learning literature with a specific focus on the neural networks (reference: Newell, Allen (1975). D. Raj Reddy (ed.). A Tutorial on Speech Understanding Systems. In Speech Recognition: Invited Papers Presented at the 1974 IEEE Symposium. New York: Academic.). Using this approach, parts of the neural network can be removed when training for a specific task. By pruning neurons or connections (synapses), single NN can be optimized to support multiple tasks. Examples of pruning are given in FIG. 11, which illustrates a complete neural network 1100, an exemplary synapse pruned neural network 1105 and an exemplary neuron pruned neural network 1110.

Using information-theoretic ideas, a class of practical and nearly optimal schemes for adapting the size of a neural network has been developed. By removing less important weights from a network, several improvements can be expected: better generalization, fewer training examples required, and improved speed of learning and/or classification. The underlying idea is to use second-derivative information to make a tradeoff between network complexity and training set error As an example, part of the neural network can be trained for object detection and another part for object tracking, or segmentation. On a lower level, part of the network can be trained for detecting one class of objects (ex. Persons), while another part can be trained for detecting another class of objects (ex. Cars).

Figure 12:
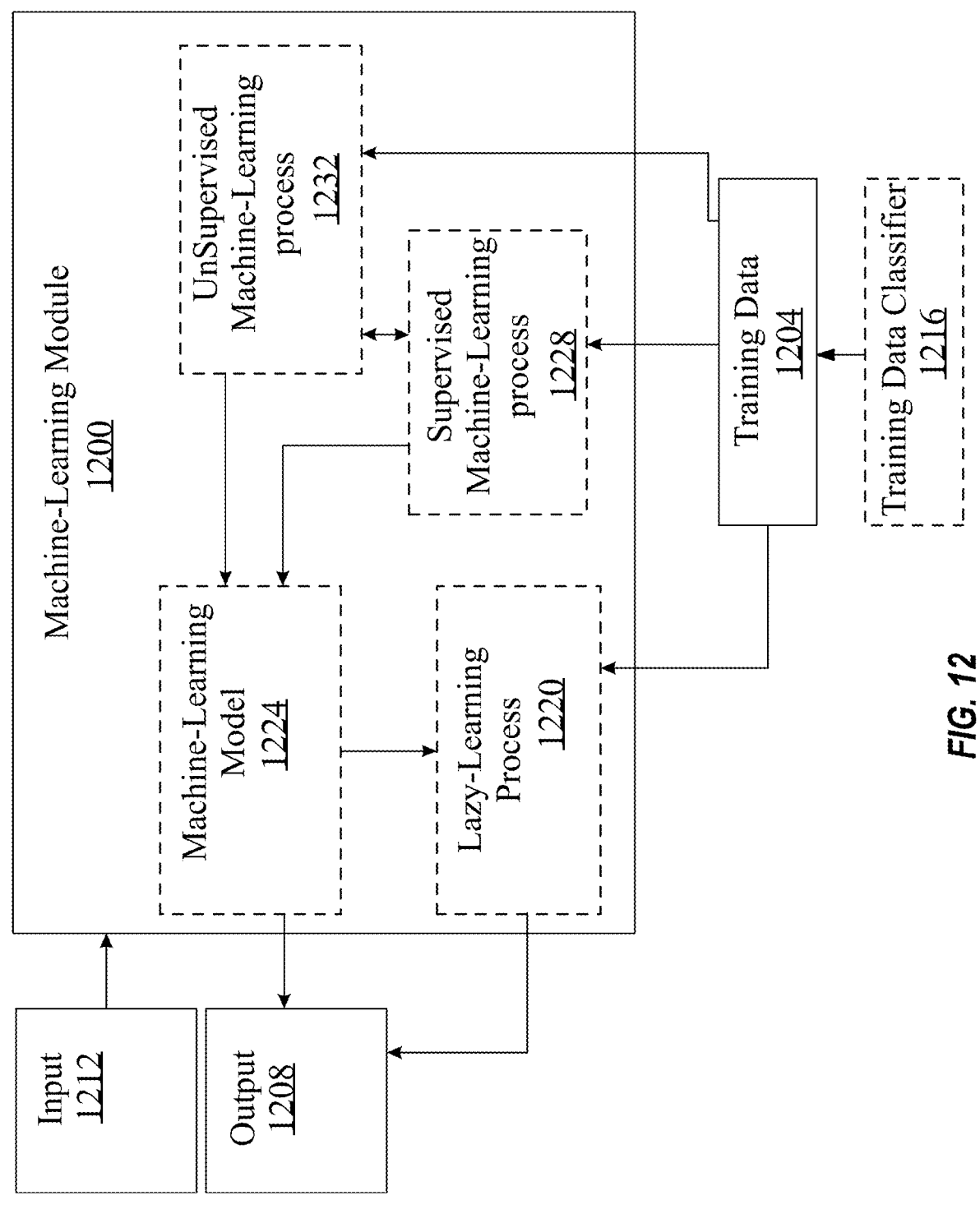
FIG. 12 is a block diagram illustrating an exemplary embodiment of a machine-learning module.

Referring now to FIG. 12, an exemplary embodiment of a machine-learning module 1200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1204 to generate an algorithm that will be performed by a computing device/module to produce outputs 1208 given data provided as inputs 1212; this is in contrast to a non-machine learning software program where the commands to be executed are determined in advance by a user and written in a programming language.

Still referring to FIG. 12, "training data," as used herein, is data containing correlations that a machine-learning process may use to model relationships between two or more categories of data elements. For instance, and without limitation, training data 1204 may include a plurality of data entries, each entry representing a set of data elements that were recorded, received, and/or generated together; data elements may be correlated by shared existence in a given data entry, by proximity in a given data entry, or the like. Multiple data entries in training data 1204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1204 according to various correlations; correlations may indicate causative and/or predictive links between categories of data elements, which may be modeled as relationships such as mathematical relationships by machine-learning processes as described in further detail below. Training data 1204 may be formatted and/or organized by categories of data elements, for instance by associating data elements with one or more descriptors corresponding to categories of data elements. As a non-limiting example, training data 1204 may include data entered in standardized forms by persons or processes, such that entry of a given data element in a given field in a form may be mapped to one or more descriptors of categories. Elements in training data 1204 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 12, training data 1204 may include one or more elements that are not categorized; that is, training data 1204 may not be formatted or contain descriptors for some elements of data. Machine-learning algorithms and/or other processes may sort training data 1204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1204 to be made applicable for two or more distinct machine-learning algorithms as described in further detail below. Training data 1004 used by machine-learning module 1200 may correlate any input data as described in this disclosure to any output data as described in this disclosure. As a non-limiting illustrative example Further referring to FIG. 12, training data may be filtered, sorted, and/or selected using one or more supervised and/or unsupervised machine-learning processes and/or models as described in further detail below; such models may include without limitation a training data classifier 1216. Training data classifier 1216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1200 may generate a classifier using a classification algorithm, defined as a processes whereby a computing device and/or any module and/or component operating thereon derives a classifier from training data 1204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 12, machine-learning module 1200 may be configured to perform a lazy-learning process 1220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1204. Heuristic may include selecting some number of highest-ranking associations and/or training data 1204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 12, machine-learning processes as described in this disclosure may be used to generate machine-learning models 1224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1224 may be generated by creating an artificial neural network, such as a convolutional neural network comprising an input layer of nodes, one or more intermediate layers, and an output layer of nodes. Connections between nodes may be created via the process of "training" the network, in which elements from a training data 1204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 12, machine-learning algorithms may include at least a supervised machine-learning process 1228. At least a supervised machine-learning process 1228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1204. Persons skilled in the art, upon reviewing the entirety of this disclosure, will be aware of various possible variations of at least a supervised machine-learning process 1228 that may be used to determine relation between inputs and outputs. Supervised machine-learning processes may include classification algorithms as defined above.

Further referring to FIG. 12, machine learning processes may include at least an unsupervised machine-learning processes 1232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 12, machine-learning module 1200 may be designed and configured to create a machine-learning model 1224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 12, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 13:
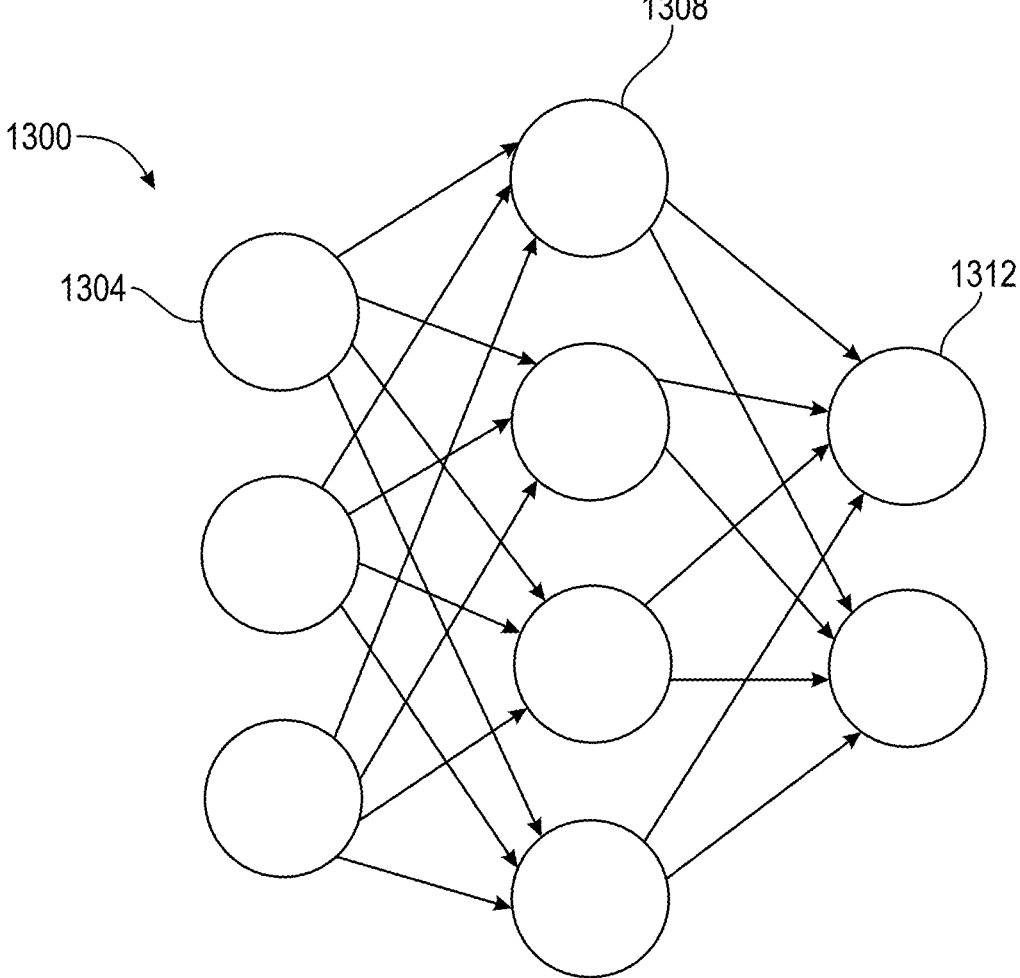
FIG. 13 is a schematic diagram illustrating an exemplary embodiment of neural network.

Referring now to FIG. 13, an exemplary embodiment of neural network 1300 is illustrated. A neural network 1300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Figure 14:
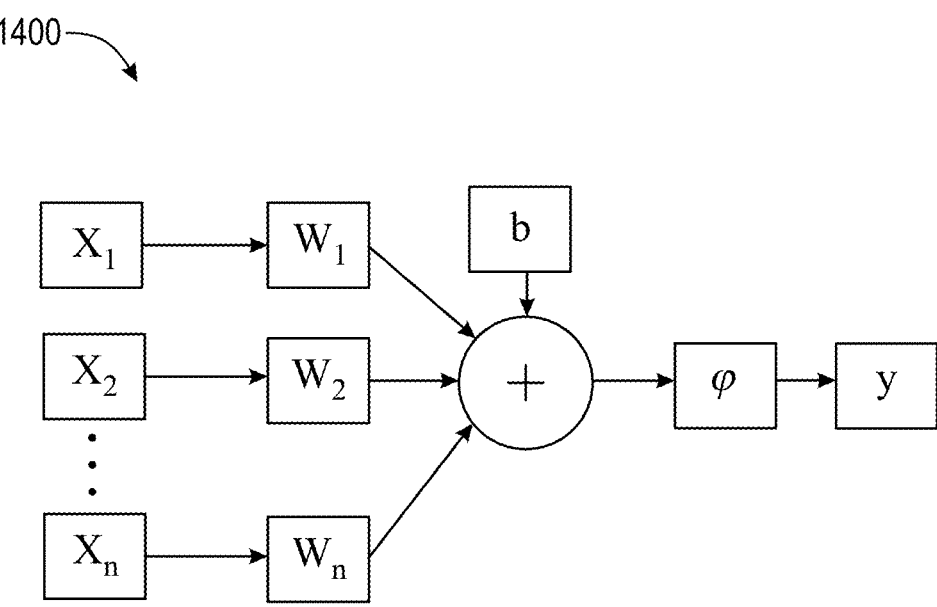
FIG. 14 is a schematic diagram illustrating an exemplary embodiment of a node of a neural network.

Referring now to FIG. 14, an exemplary embodiment of a node of a neural network is illustrated. A node may include, without limitation a plurality of inputs x; that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 14, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Figure 15:
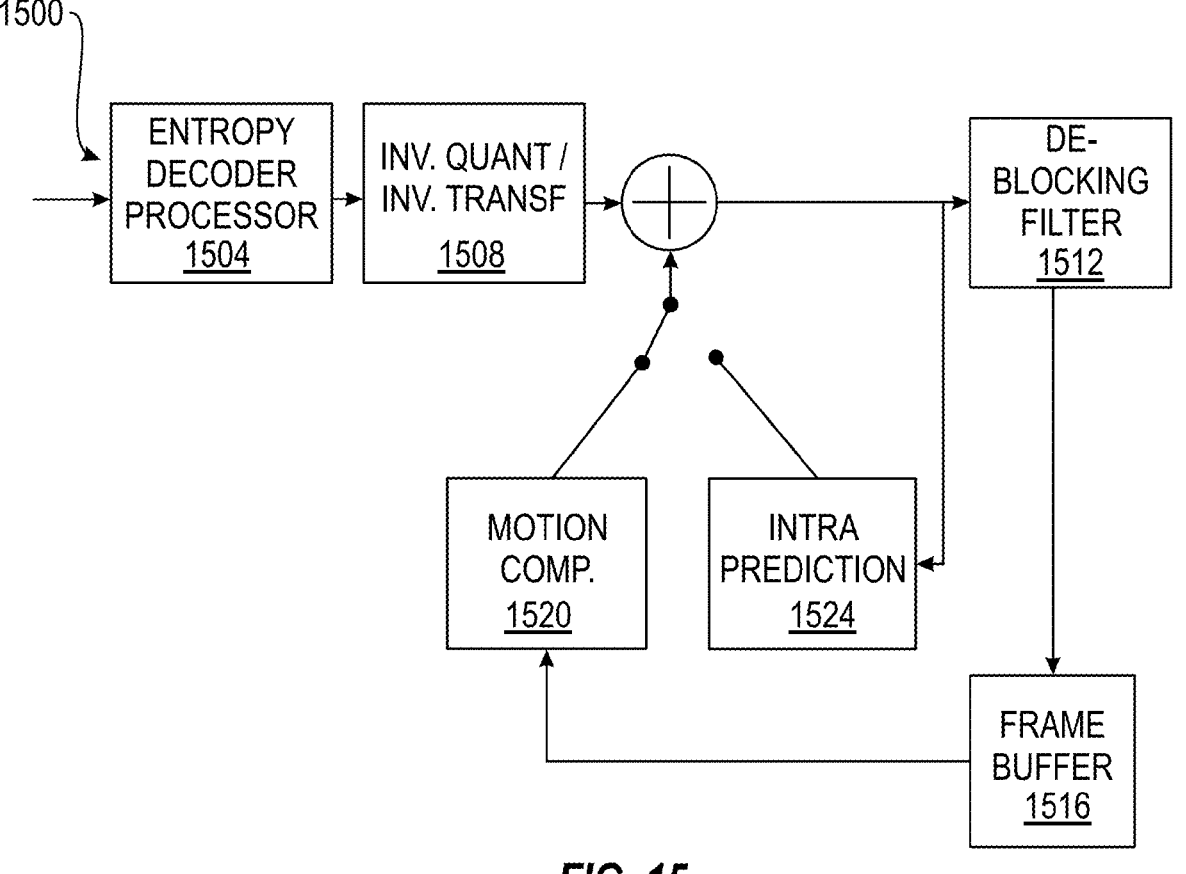
FIG. 15 is a block diagram illustrating an exemplary embodiment of a video decoder.

FIG. 15 is a system block diagram illustrating an example decoder 1500 capable of adaptive cropping. Decoder 1500 may include an entropy decoder processor 1504, an inverse quantization and inverse transformation processor 1508, a deblocking filter 1512, a frame buffer 1516, a motion compensation processor 1520 and/or an intra prediction processor 1524.

In operation, and still referring to FIG. 15, bit stream 1528 may be received by decoder 1500 and input to entropy decoder processor 1504, which may entropy decode portions of bit stream into quantized coefficients. Quantized coefficients may be provided to inverse quantization and inverse transformation processor 1508, which may perform inverse quantization and inverse transformation to create a residual signal, which may be added to an output of motion compensation processor 1520 or intra prediction processor 1524 according to a processing mode. An output of the motion compensation processor 1520 and intra prediction processor 1524 may include a block prediction based on a previously decoded block. A sum of prediction and residual may be processed by deblocking filter 1512 and stored in a frame buffer 1516.

In an embodiment, and still referring to FIG. 15 decoder 1500 may include circuitry configured to implement any operations as described above in any embodiment as described above, in any order and with any degree of repetition. For instance, decoder 1500 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 16:
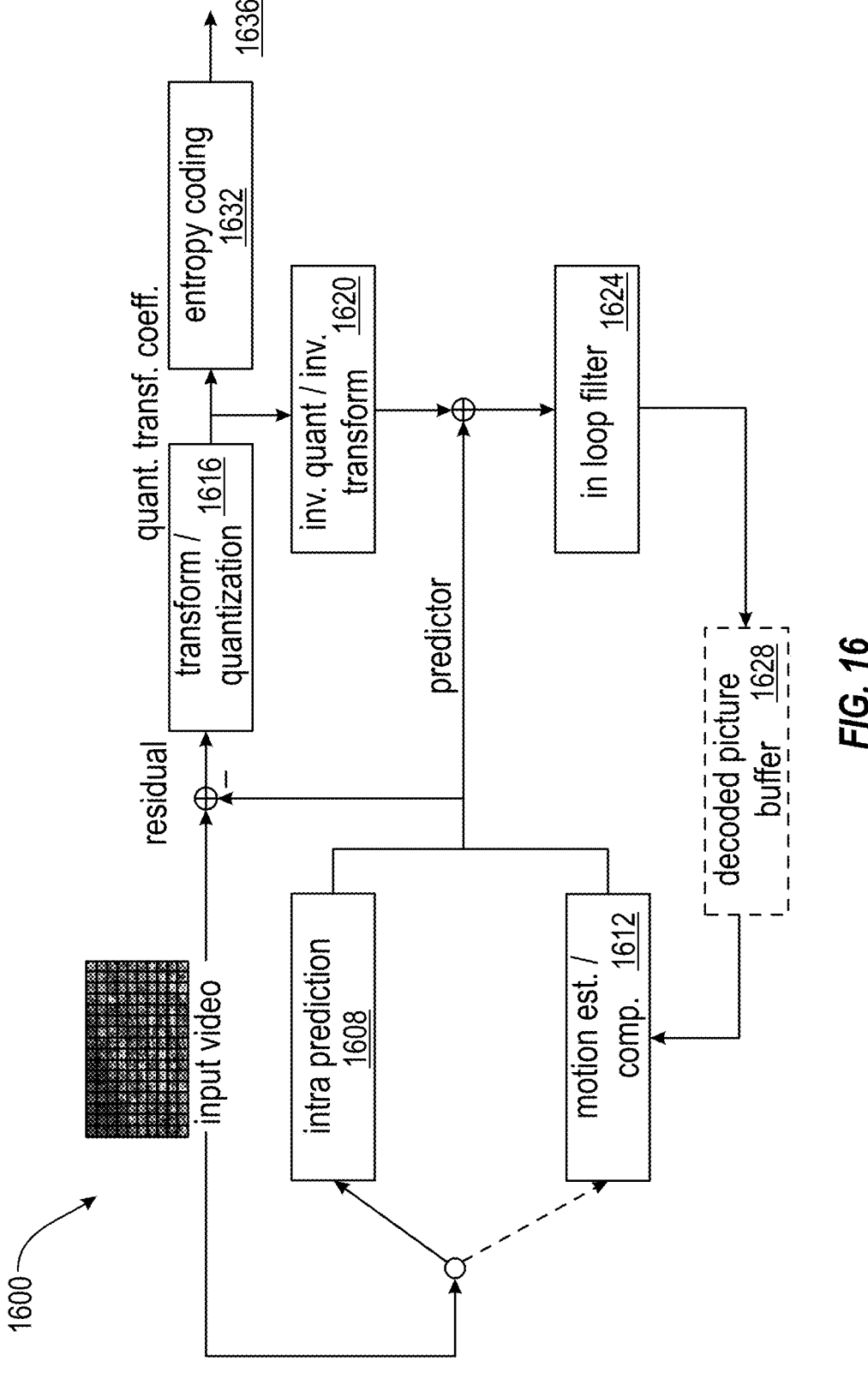
FIG. 16 is a block diagram illustrating an exemplary embodiment of a video encoder.

FIG. 16 is a system block diagram illustrating an example video encoder 1600 capable of adaptive cropping. Example video encoder 1600 may receive an input video 1604, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 16, example video encoder 1600 may include an intra prediction processor 1608, a motion estimation/compensation processor 1612, which may also be referred to as an inter prediction processor, capable of constructing a motion vector candidate list including adding a global motion vector candidate to the motion vector candidate list, a transform/quantization processor 1616, an inverse quantization/inverse transform processor 1620, an in-loop filter 1624, a decoded picture buffer 1628, and/or an entropy coding processor 1632. Bit stream parameters may be input to the entropy coding processor 1632 for inclusion in the output bit stream 1636.

In operation, and with continued reference to FIG. 16, for each block of a frame of input video, whether to process block via intra picture prediction or using motion estimation/compensation may be determined. Block may be provided to intra prediction processor 1608 or motion estimation/compensation processor 1612. If block is to be processed via intra prediction, intra prediction processor 1608 may perform processing to output a predictor. If block is to be processed via motion estimation/compensation, motion estimation/compensation processor 1612 may perform processing including constructing a motion vector candidate list including adding a global motion vector candidate to the motion vector candidate list, if applicable.

Further referring to FIG. 16, a residual may be formed by subtracting a predictor from input video. Residual may be received by transform/quantization processor 1616, which may perform transformation processing (e.g., discrete cosine transform (DCT)) to produce coefficients, which may be quantized. Quantized coefficients and any associated signaling information may be provided to entropy coding processor 1632 for entropy encoding and inclusion in output bit stream 1636. Entropy encoding processor 1632 may support encoding of signaling information related to encoding a current block. In addition, quantized coefficients may be provided to inverse quantization/inverse transformation processor 1620, which may reproduce pixels, which may be combined with a predictor and processed by in loop filter 1624, an output of which may be stored in decoded picture buffer 1628 for use by motion estimation/compensation processor 1612 that is capable of constructing a motion vector candidate list including adding a global motion vector candidate to the motion vector candidate list.

With continued reference to FIG. 16, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 16, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 16, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 16, encoder 1600 may include circuitry configured to implement any operations as described above in any embodiment, in any order and with any degree of repetition. For instance, encoder 1600 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 1600 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 16, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations decoder 900 and/or encoder 1600 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 17:
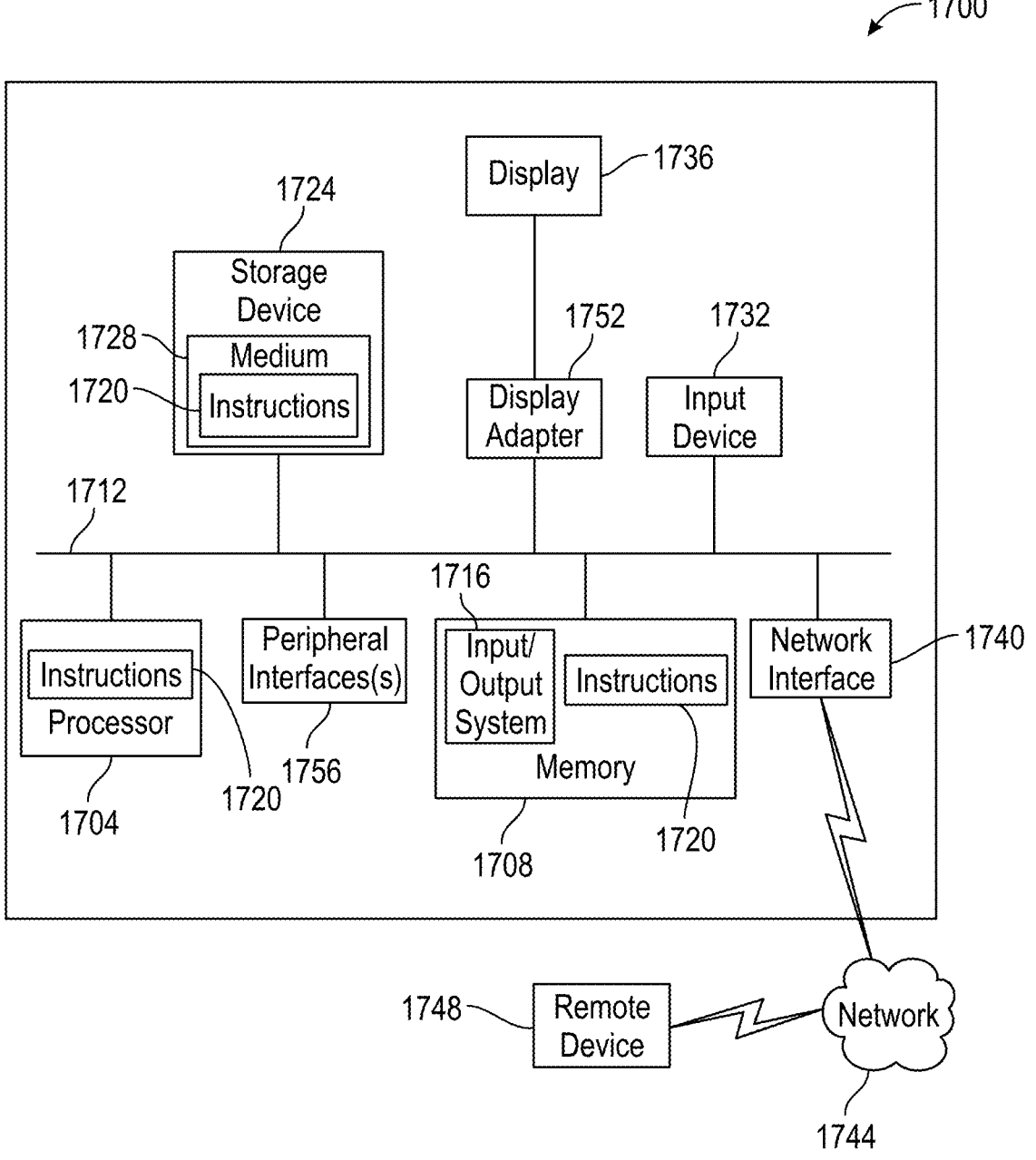
FIG. 17 is a block diagram of a computing system that can be used to implement any one or more of the methodologies disclosed herein and any one or more portions thereof.

FIG. 17 shows a diagrammatic representation of one embodiment of a computing device in the exemplary form of a computer system 1700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1700 includes a processor 1704 and a memory 1708 that communicate with each other, and with other components, via a bus 1712. Bus 1712 may include any of several types of bus structures including, but not limited to, a memory bus, a memory controller, a peripheral bus, a local bus, and any combinations thereof, using any of a variety of bus architectures.

Processor 1704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1704 may be organized according to Von Neumann and/or Harvard architecture as a non-limiting example. Processor 1704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 1708 may include various components (e.g., machine-readable media) including, but not limited to, a random-access memory component, a read only component, and any combinations thereof. In one example, a basic input/output system 1716 (BIOS), including basic routines that help to transfer information between elements within computer system 1700, such as during start-up, may be stored in memory 1708. Memory 1708 may also include (e.g., stored on one or more machine-readable media) instructions (e.g., software) 1720 embodying any one or more of the aspects and/or methodologies of the present disclosure. In another example, memory 1708 may further include any number of program modules including, but not limited to, an operating system, one or more application programs, other program modules, program data, and any combinations thereof.

Computer system 1700 may also include a storage device 1724. Examples of a storage device (e.g., storage device 1724) include, but are not limited to, a hard disk drive, a magnetic disk drive, an optical disc drive in combination with an optical medium, a solid-state memory device, and any combinations thereof. Storage device 1724 may be connected to bus 1712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1724 (or one or more components thereof) may be removably interfaced with computer system 1700 (e.g., via an external port connector (not shown)). Particularly, storage device 1724 and an associated machine-readable medium 1728 may provide nonvolatile and/or volatile storage of machine-readable instructions, data structures, program modules, and/or other data for computer system 1700. In one example, software 1720 may reside, completely or partially, within machine-readable medium 1728. In another example, software 1720 may reside, completely or partially, within processor 1704.

Computer system 1700 may also include an input device 1732. In one example, a user of computer system 1700 may enter commands and/or other information into computer system 1700 via input device 1732. Examples of an input device 1732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1732 may be interfaced to bus 1712 via any of a variety of interfaces (not shown) including, but not limited to, a serial interface, a parallel interface, a game port, a USB interface, a FIRE-WIRE interface, a direct interface to bus 1712, and any combinations thereof. Input device 1732 may include a touch screen interface that may be a part of or separate from display 1736, discussed further below. Input device 1732 may be utilized as a user selection device for selecting one or more graphical representations in a graphical interface as described above.

A user may also input commands and/or other information to computer system 1700 via storage device 1724 (e.g., a removable disk drive, a flash drive, etc.) and/or network interface device 1740. A network interface device, such as network interface device 1740, may be utilized for connecting computer system 1700 to one or more of a variety of networks, such as network 1744, and one or more remote devices 1748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1744, may employ a wired and/or a wireless mode of communication. In general, any network topology may be used. Information (e.g., data, software 1720, etc.) may be communicated to and/or from computer system 1700 via network interface device 1740.

Computer system 1700 may further include a video display adapter 1752 for communicating a displayable image to a display device, such as display device 1736. Examples of a display device include, but are not limited to, a liquid crystal display (LCD), a cathode ray tube (CRT), a plasma display, a light emitting diode (LED) display, and any combinations thereof. Display adapter 1752 and display device 1736 may be utilized in combination with processor 1704 to provide graphical representations of aspects of the present disclosure. In addition to a display device, computer system 1700 may include one or more other peripheral output devices including, but not limited to, an audio speaker, a printer, and any combinations thereof. Such peripheral output devices may be connected to bus 1712 via a peripheral interface 1756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. A machine video decoder for a machine video task comprising:
a first decoder receiving a bitstream, the bitstream having at least one feature map extracted from a video signal by a neural network backbone at an encoder and a description of the neural network backbone, the neural network backbone being a first part of a convolutional neural network and comprising a first set of convolution layers and a first set of pooling layers, the first decoder being one of an AVC decoder, an HEVC decoder and a VVC decoder and providing the at least one feature map and backbone description as outputs;
a neural network head comprising a second part of the convolutional neural network, the neural network head being trained for a specific machine task, the neural network head receiving the backbone description and at least one feature map from the first decoder and generating a task-specific output for the machine video task, wherein the neural network head comprises a deep neural network.

2. The machine video decoder of claim 1, further comprising a plurality of neural network heads, each of said neural network heads being trained for a specific task and receiving the at least one feature map and the output of the neural network backbone and generating a task-specific output.

3. The machine video decoder of claim 1 wherein the second part of the convolutional neural network further comprises a second set of one or more convolution layers and a second set of one or more pooling layers.

4. The machine video decoder of claim 1 wherein the bitstream includes a feature sequence parameter set containing first information about feature maps, a plurality of feature picture parameter sets containing second information about the feature maps, and a plurality of feature picture headers containing third information about the feature maps.

5. The machine video decoder of claim 1 wherein the bitstream contains an SEI message containing information about the first part of the convolutional neural network.

6. The machine video decoder of claim 1 wherein a split point between the first part of the convolutional neural network and the second part of the convolutional neural network is adaptively selected.

7. The machine video decoder of claim 1 wherein the bitstream contains information about the size and position of the feature maps.

8. A method for decoding an encoded bitstream for a machine video task comprising:

receiving a bitstream encoded using one of an AVC, HEVC, or VVC compliant encoding protocol, the bitstream including a sequence of feature maps extracted from a source video by an encoder using a first part of a convolutional neural network comprising a first set of one or more convolution layers and a first set of one or more pooling layers, and decoding the bitstream with one of an AVC decoder, an HEVC decoder, or a VVC decoder and outputting the sequence of feature maps; and applying the sequence of feature maps from the first part of the convolutional neural network to a second part of the convolutional neural network, the second part of the convolutional neural network completing the machine video task, wherein the second part of the convolutional neural network comprises a deep neural network.

9. The decoding method of claim 8 wherein the second part of the convolutional neural network further comprises a second set of one or more convolution layers and a second set of one or more pooling layers.

10. The decoding method of claim 8 wherein the bitstream includes a feature sequence parameter set containing first information about feature maps, a plurality of feature picture parameter sets containing second information about the feature maps, and a plurality of feature picture headers containing third information about the feature maps.

11. The decoding method of claim 8 wherein the bitstream contains an SEI message containing information about the first part of the convolutional neural network.

12. The decoding method of claim 8 wherein the bitstream includes information about the first part of the convolutional neural network.

13. The decoding method of claim 9 wherein a split point between the first part of the convolutional neural network and the second part of the convolutional neural network is adaptively selected.

14. The decoding method of claim 8 wherein the machine task is a machine vision task.

15. The decoding method of claim 8, wherein the machine vision task is one of detecting a class of an object, tracking an object, and object segmentation.

16. The decoding method of claim 8 further comprising outputting the feature maps to a plurality of second parts of a convolutional neural network, each second part for completing a different machine video task.

17. The decoding method of claim 8 wherein the deep neural network is a fully connected neural network.

18. The decoding method of claim 8 wherein the bitstream contains information about the size and position of the feature maps.

19. A machine video encoder for a machine video task, the encoder comprising:

a feature map extractor, the feature map extractor being a first part of a convolutional neural network and comprising a first set of convolution layers and a first set of pooling layers, the feature map extractor outputting a sequence of feature maps extracted from an input source video, and an encoder encoding the extracted feature maps using one of an AVC, an HEVC encoder, or a VVC encoding protocol to generate an encoded bitstream for a machine video task to be completed at a decoding site having a second part of the convolutional neural network.

20. The machine video encoder of claim 19 wherein the bitstream includes a feature sequence parameter set containing first information about the feature maps, a plurality of feature picture parameter sets containing second information about the feature maps, and a plurality of feature picture headers containing third information about the feature maps.

21. The machine video encoder of claim 20 wherein the bitstream contains an SEI message containing information about the first part of the convolutional neural network.

22. The machine video encoder of claim 20 wherein the bitstream includes information about the first part of the convolutional neural network.

23. The encoder of claim 20 wherein a split point between the first part of the convolutional neural network and the second part of the convolutional neural network is adaptively selected.

24. The encoder of claim 20 wherein the machine task is one of detecting a class of an on object, tracking an object, or object segmentation.

*   *   *   *   *